United States Patent
Janke et al.

(10) Patent No.: US 6,382,718 B1
(45) Date of Patent: May 7, 2002

(54) AUTOMATICALLY FASTENABLE VEHICLE SEAT

(75) Inventors: Astrid Janke, Sindelfingen (DE); Miroslav Jiskra, Prague (CZ)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/472,522

(22) Filed: Dec. 27, 1999

(30) Foreign Application Priority Data

Dec. 24, 1998 (DE) .......................................... 198 60 234

(51) Int. Cl.⁷ ................................................. B60N 2/42
(52) U.S. Cl. ............... 297/216.16; 248/563; 297/216.1; 297/216.19; 297/468
(58) Field of Search .................... 297/216.1, 216.16, 297/216.19, 468, 216.17; 248/563

(56) References Cited

U.S. PATENT DOCUMENTS

| | | | | |
|---|---|---|---|---|
| 4,154,472 A | * | 5/1979 | Bryll ................... | 297/216.1 X |
| 4,225,178 A | | 9/1980 | Takada .................... | 297/216.1 |
| 4,344,597 A | * | 8/1982 | Frimen ................... | 248/563 X |
| 4,566,667 A | * | 1/1986 | Yanagisawa ............ | 248/563 X |
| 5,366,268 A | * | 11/1994 | Miller et al. ............. | 297/216.1 |

FOREIGN PATENT DOCUMENTS

| | | |
|---|---|---|
| DE | 1 055 977 | 10/1959 |
| DE | 1 238 547 | 7/1971 |
| DE | 72 39 692 | 1/1973 |
| DE | 7239693 | 2/1973 |
| DE | 28 43 669 | 4/1980 |
| DE | 195 07 339 | 9/1996 |

* cited by examiner

Primary Examiner—Peter R. Brown
(74) Attorney, Agent, or Firm—Crowell & Moring LLP (57) ABSTRACT

A vehicle seat having a seat part which is vibrationally movably supported on a seat subframe by way of a multi-spring arrangement. The seat part can be fixed, as required, at the seat subframe while the vibrational mobility is largely canceled.

10 Claims, 6 Drawing Sheets

Fig. 5

AUTOMATICALLY FASTENABLE VEHICLE SEAT

This application claims priority of DE 198 60 234.0.14, filed Dec. 24, 1998, the disclosure of which is expressly incorporated by reference herein.

BACKGROUND OF THE INVENTION

The present invention relates to a vehicle seat, and more particularly, to a vehicle whose seat part is vibrationally movably supported by way of a spring arrangement comprising several springs on a seat subframe, the springs being fastened by means of their respective one end to the seat part and by means of their other end to the seat subframe.

A vehicle bucket seat is shown in DE-PS 1 055 977. The seat part of this vehicle seat is vibrationally movably supported on a seat subframe by way of a spring arrangement comprising several spring elements, such as rubber sliding elements, turn-slide springs or spreading rubber elements. One respective end of the springs is fastened, by the seat part and on their other respective end on the seat subframe. For the longitudinal adjustment of the vehicle seat, the seat subframe is slidably arranged on a frame.

This known vehicle seat has a particular disadvantage in that a buckle of a seat belt anchored on a column can in practice not be fastened on the vibrationally movable vehicle seat itself. On the contrary, in the event of an accident, the risk exists that, because of the belt force acting upon the vehicle seat caused by a vehicle occupant by way of the seat belt and the buckle fastened to the vehicle seat, the spring elements may give or overstretch. If to avoid the problem, the buckle is arranged on the vehicle floor, there is the disadvantage that, when the vehicle seat is longitudinally adjusted, the belt buckle does not follow and the course of the lap belt is not adapted very well to the respective position of the vehicle occupant's pelvis.

DE-GM 72 39 692 and DE-GM 72 39 693 shows a vehicle seat whose seat part is vertically changeably guided and supported on the seat subframe in each case by way of two parallelogram levers arranged on both sides of the seat. A spring strut, which comprises a spring and a damper, is linked by its upper end to one parallelogram lever respectively on both sides of the seat and is connected by its lower end with the seat subframe. In addition, a hook-type bow is swivellably disposed on the seat subframe so that the spring travel of the seat part can be blocked and this seat part can be fixed on the seat subframe. A handle allows for optional adjustment of the hook-type bow such that, in the event of a stronger compression, a blocking of the seat part takes place or does not take place. The blocking of the seat part takes place only with a time delay after the operating of the handle, when the seat part is compressed sufficiently deeply. In this vehicle seat, an assigned restraining system is not used.

DE 195 07 339 C2 illustrates a vehicle seat whose seat part is resiliently arranged on a seat subframe by way of a tension spring device. By suspending or connecting additional springs, the spring force of the tension spring device can be changed and can be adapted to the weight of the person sitting down in the vehicle seat.

SUMMARY OF THE INVENTION

An object of the present invention is to provide a vehicle seat in which the constructive possibilities with respect to designing a restraining system assigned to the vehicle seat are greatly improved.

According to the present invention, this object has been achieved by providing a vehicle seat in which a locking mechanism is operatively arranged between the seat part and the seat subframe such that, in the event of an accident, the seat part is automatically fastened to the seat subframe while vibrational mobility is substantially canceled for an improved effect of a seat belt system assigned to the vehicle seat.

As the result of the seat part which, if required, can be fixed to the seat subframe, for example, the buckle of the seat belt system can be fastened on the seat part without reducing the safety for the vehicle occupant. Particularly in the event of an accident, a vehicle occupant who is strapped to the seat part by way of the seat belt system is therefore also fastened to the seat subframe. Thereby a "give" of the spring arrangement and, for example, a connected raising of the vehicle seat, which are dangerous to the vehicle occupant, can be avoided. Depending on the type of the fixing of the seat part, the swinging mobility can be at least largely eliminated in a manner which lowers the danger of injury to the vehicle occupant.

Another advantage resides in this fixing and of a buckle which can therefore be mounted on the seat part without reducing safety is that is, independently of the longitudinal adjustment of the vehicle seat, the buckle is always situated in the most favorable position relative to the vehicle occupant's pelvis. In addition, a belt tightener force, which is triggered in the event of an accident, can be introduced into the seat subframe by way of the buckle and the seat part. This triggering occurs without any admission of this force to the spring arrangement and without an at least partial reduction of the effect of a belt tightener. The fastening is advantageous, however not only in the event of an accident. As an alternative, the present invention also contemplates that the vehicle occupant optionally does not fix the seat part for a comfortable driving but for a sporty driving.

Thus, it has been found to be particularly advantageous to use four spiral springs which are preferably arranged laterally in the front and the rear and are supported on the seat subframe. This arrangement results in a particularly advantageous force distribution of the vehicle occupant's weight on the seat subframe and in a particularly effective spring support.

In a further development of the invention, despite its fixing on the seat subframe, the seat part is longitudinally adjustably fastened on the vehicle floor. As a result, the vehicle occupant is provided with a significant adjusting possibility.

It has also been found to be advantageous to use approximately C-shaped spiral springs which have very good suspension characteristics and, in addition, hardly permit any vibrations of the seat part in the horizontal direction. With approximately crescent-shaped spiral springs, it has been found to be particularly advantageous to use an elastically flexible core which is particularly suitable for damping vibrations.

By receiving the two ends of the spiral springs of one clamp-type socket respectively, a particularly stable connection is established between the respective spiral spring and the seat part or the seat subframe. In addition, it has been found to be advantageous to produce the core from a plastic material of a high damping characteristic. The core can be made, for example, of a polymer or an elastomer, depending on the comfort required for the vehicle occupant.

An approximately U-shaped frame connected with the spiral springs makes the vibration movement of the spiral springs is made uniform, particularly for increasing comfort and safety.

In a particularly simple manner, the seat part can be fixed on the seat subframe by a locking mechanism which is provided between the seat part and the seat subframe and can be operated by an accident-caused belt tension force of the seat belt.

Finally, the locking mechanism is particularly effective when comprised of at least two toothed racks assigned to one of the rearward spiral springs respectively. One of the toothed racks respectively is preferably, by a belt tension force, on the buckle, on one hand, and, on a fitting, on the other hand, which fitting is fastened on the seat part for fixing one end of the seat belt on the side facing away from the belt buckle, engaged with corresponding locking devices on the seat part. Of course, it is also within the scope of the present invention that a toothed rack for locking the seat part with the seat subframe is provided on each spiral spring.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
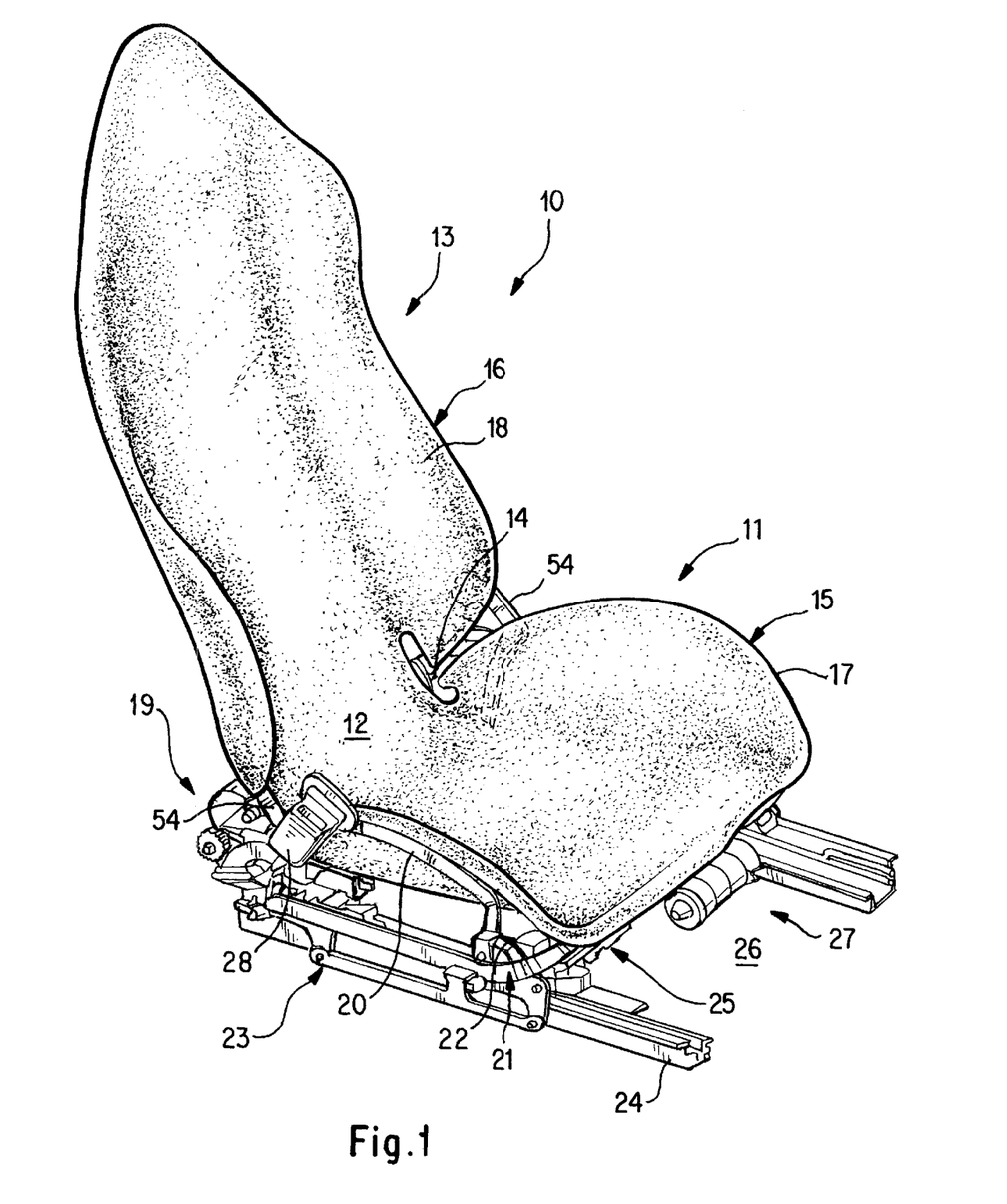
FIG. 1 is a perspective view of a vehicle seat according to a currently preferred embodiment of the invention.

FIG. 1 illustrates a vehicle seat 10 which is constructed as a bucket seat and has a bucket-shaped seat part 11 and a backrest part 13 which is swivellably arranged on this seat part 11 by way of a bending-elastic connection section 12. In the embodiment illustrated here, the seat part 11, the connection section 12 and the backrest part 13 form a one-piece seat bucket made of a fiber composite. The seat part and the backrest part 11, 13 as well as the connection section 12 can be covered with an adapted cushioning. In order to permit a smooth-running inclination adjustment of the backrest part 13, the seat bucket is provided with lateral incisions 14 which lower the bending resistance of the connection section 12. The lateral edge areas 15, 16 of the seat part 11 and of the backrest part 13 are shaped as bent side cheeks 17, 18 which provide a lateral hold to the vehicle occupant. In the area of the lateral incisions 14 in the connection section 12, a portion of the backrest adjusting device 19 for adjusting the inclination of the backrest part 13 is visible.

The seat part 11 of the vehicle seat 10 comprises two respectively laterally arranged supporting yokes 20 which, by way of a spring arrangement 21 with four spiral springs 22 arranged laterally in the front and the rear, are supported on a seat subframe and will be explained in detail in the following with particular reference to FIGS. 2 to 4b. The vehicle seat 10 and the seat subframe 23 are longitudinally adjustable and lockable by a longitudinal adjusting arrangement 25 in the guide rails 24 which are arranged parallel to one another on the floor of a motor vehicle.

Figure 2:
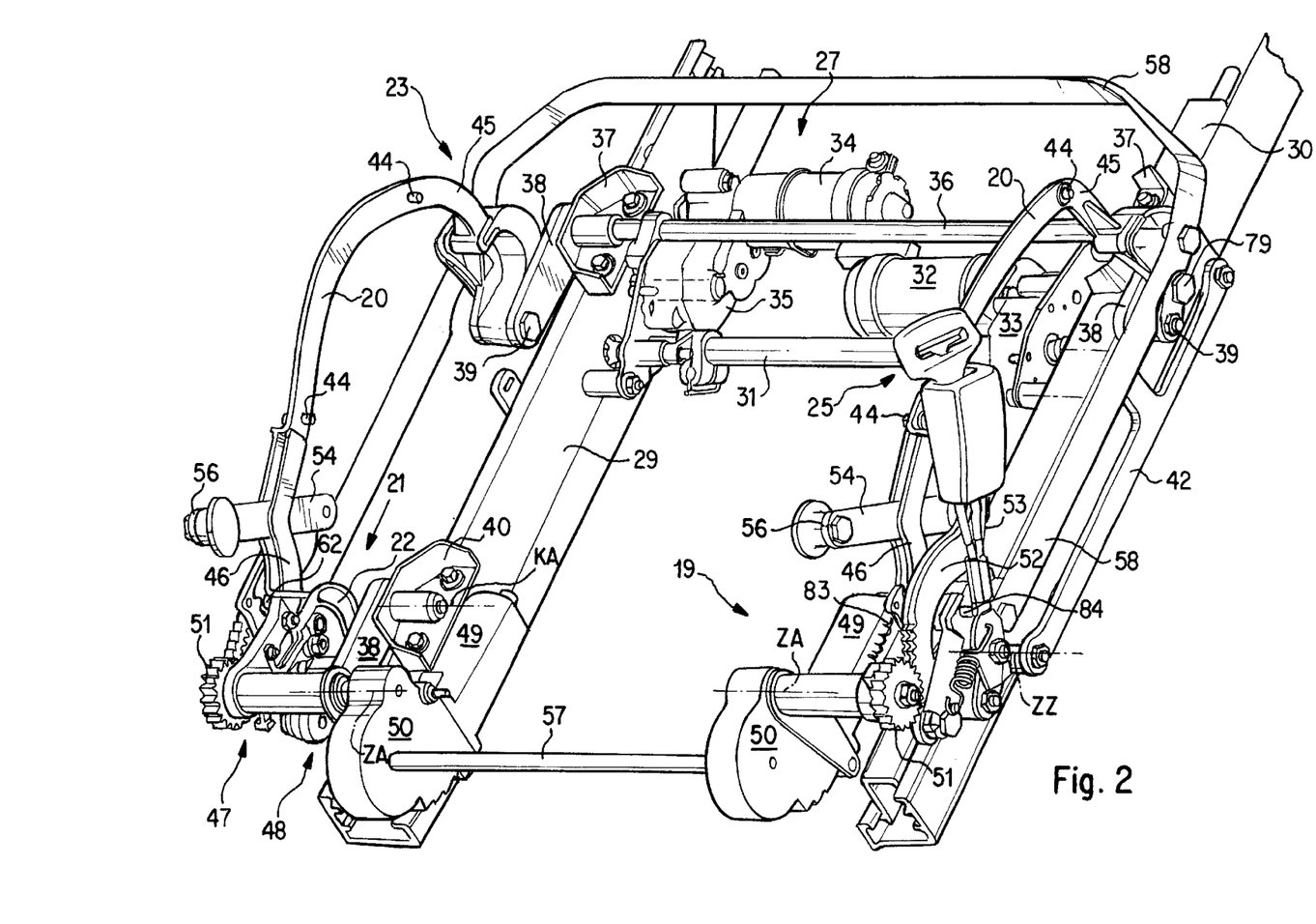
FIG. 2 is a perspective view of the vehicle seat according to the invention supported by a spring arrangement on a seat subframe.

A height adjusting arrangement 27, to which reference will be made in detail particularly with reference to FIG. 2, provides that the vehicle seat 10 can also be electrically vertically adjusted and locked at the adjusted height. Only a buckle 28 is visible here of a seat belt system. The buckle 28 is fastened on one side of the vehicle seat 10 on the seat part 11. A fitting is fastenable for fixing an end of the seat belt on the side facing away from the buckle 28 on the seat part 11.

FIG. 2 is a perspective view of the seat subframe 23 with one respective interior rail 29, 30 which is longitudinally displaceably guided by the guide rails 24. A shaft 31 is arranged between the interior rails 29, 30 and is driven and locked by a motor 32 which is arranged on one of the interior rails 39, 30. The motor 32 has a transmission 33 of the longitudinal adjusting arrangement 25. For this purpose, one respective gear wheel is fastened to the ends of the shaft 31 rotationally disposed in the interior rails 29, 30. The gear wheel meshes with a toothed rack in a generally known manner and is fastened to the guide rail 14.

Figure 3:
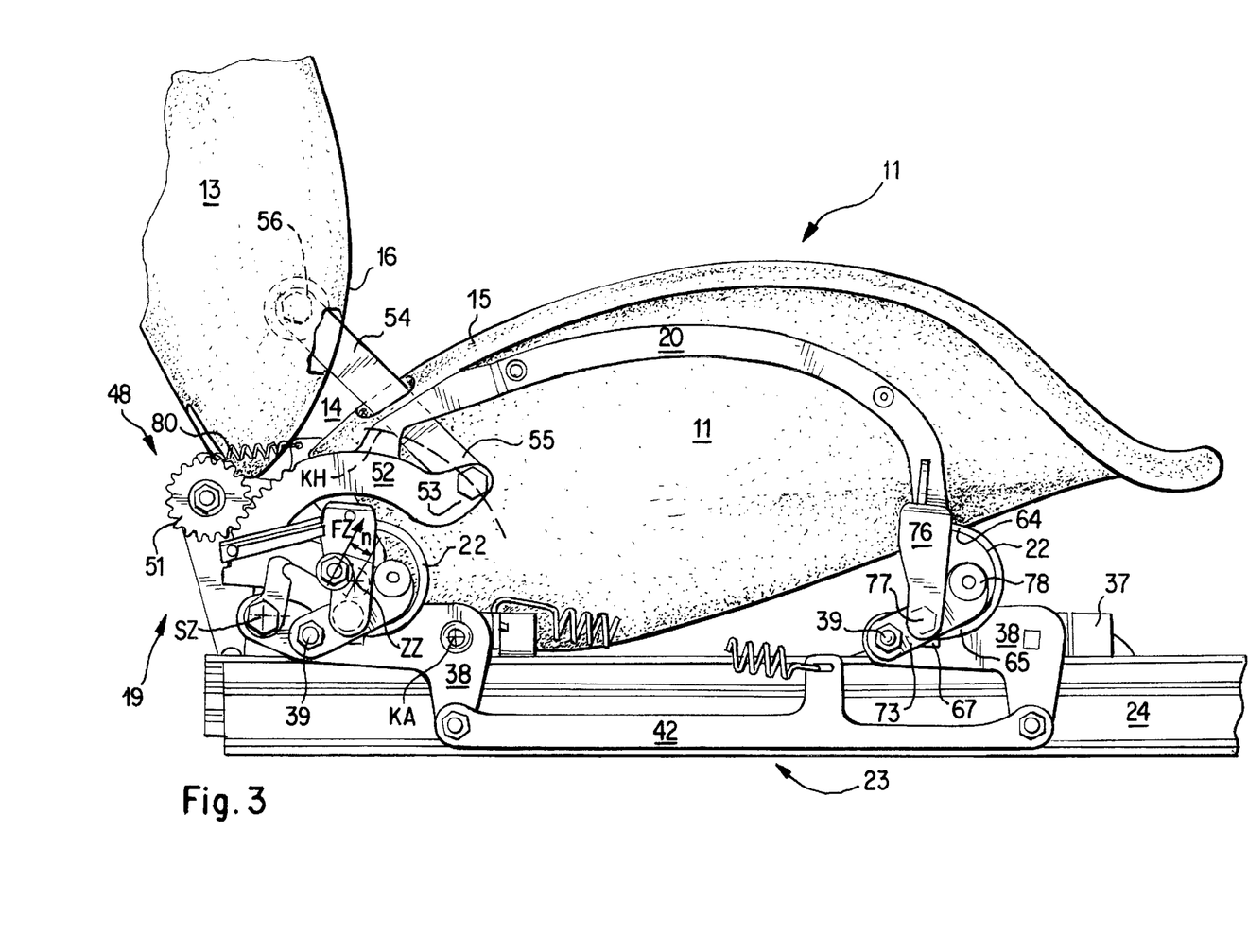
FIG. 3 is a side view of a seat part and of the seat subframe of the vehicle seat according to the invention.

For driving and locking a shaft 36, the height adjusting arrangement 27 comprises a motor 34 and a transmission 35 which are fastened to one of the interior rails 29, 30. One respective forward receiving device 37 rotationally disposes the shaft 36 on the interior rails 29, 30. At the ends of the shaft 36, one angular crank 38 respectively is fastened, as seen in FIG. 3, at whose one leg end, the spiral springs 22 are swivellably disposed by way of one screwed connection 39 respectively. On the rearward ends of the interior rails 29, 30, two rearward angular cranks 38 are swivellably disposed about an axis KA on rearward receiving devices 40.

As illustrated particularly in FIG. 3, the shape of the rearward cranks 38 corresponds approximately to that of the forward cranks 38. The spiral springs 22 are swivellably disposed by one screwed connection 39 respectively also on the respective one leg end of the rearward angular cranks 38. The other leg ends of the forward and rearward cranks 38, which are laterally assigned to one another, are connected with one another in an articulated manner by a linkage 42.

During an adjustment of the shaft 36, not only the forward cranks 38 are swivelled but, by way of the linkage 42, also the rearward cranks 38 are swivelled. As a result, the four cranks 38 are synchronized, and a uniform height adjustment is obtained via all four cranks 38. If the height adjustment of the forward cranks 38 is to take place separately of that of the rearward cranks 38, the linkage 42 is unnecessary. The rearward cranks 38 would then have to be driven separately by an additional motor and a shaft connecting the rearward cranks 38. If the two forward and the two rearward cranks 38 are driven by a separate forward and rearward motor, an inclination adjustment of the seat part 11 is also implemented.

The two lateral supporting yokes 20 are connected by two screws 44 respectively with the seat part 11 not illustrated in FIG. 2. The two supporting yokes 20 are supported on the spiral springs 22 with a forward and a rearward end 45, 46 respectively. The forward and rearward ends 45, 46 can, however, also be directly fastened on the seat part 11, so that at least in areas, the supporting yokes 20 can be eliminated. Rearward receiving devices 47 are fastened at the rearward end 46 of the supporting yokes 20. A driving mechanism 48 of the backrest adjusting device 19 is fastened on the receiving devices 47.

The driving mechanism 48 comprises two motors 49, each with a transmission 50. The motors 49 are arranged laterally inside the interior rails 29, 30 and, by way of which a left and a right driving pinion 51, are driven about an axis ZA. One curved rack 52 respectively, which can be swivelled about its axis ZZ, engages with the two driving pinions 51. At one end 53 of the curved toothed racks 52 respectively, an assigned control-arm-type lever 54 is arranged in an articulated manner. A respective upper end 56 of the control-arm-type levers 54 is swivellably disposed on the respective assigned side cheek 18, 19 of the backrest part 13.

By operating the motors 49, via the toothed racks 52 and the levers 54, the backrest part 13 can therefore be adjusted in its inclination with respect to the seat part 11. The two transmissions 50 and thus also the two levers 54 are synchronized with one another by a shaft 57. The backrest part 13 is swiveled in the area of the bendable connection section 14 with respect to the seat part 11.

Figure 4A:
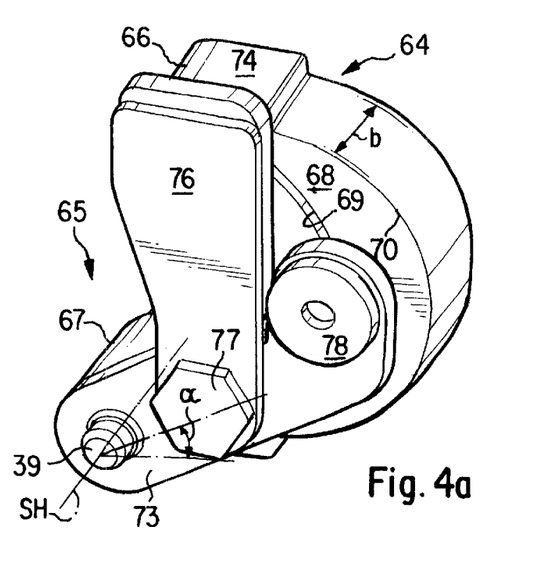
FIGS. 4a and 4b are enlarged perspective side views respectively of a spiral spring of the spring arrangement.
Figure 4B:
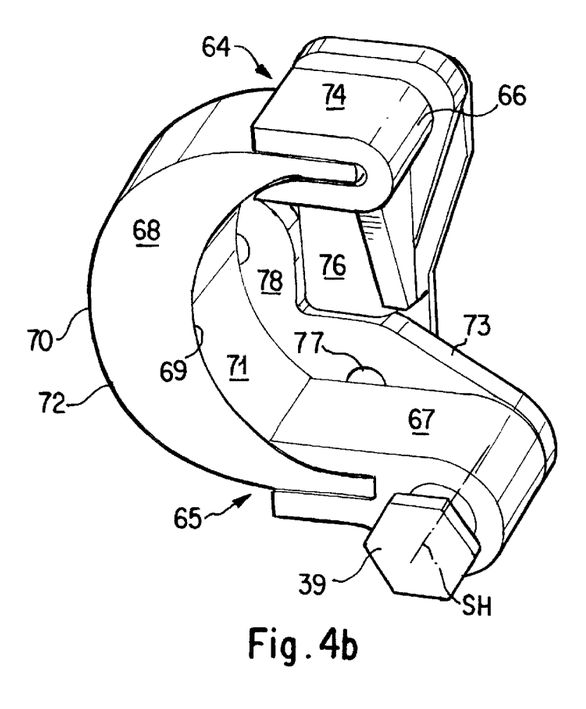

FIG. 2 also shows a U-shaped frame 58 which is used for causing the compression movement and the rebounding movement of the spiral springs 22 to be uniform and will be discussed in the following particularly with reference to FIGS. 4a and 4b. In the area of each of the rearward spiral springs 22, a respective locking mechanism 59 is provided which will be explained in detail particularly with reference to FIGS. 5 and 6. The locking mechanism 59 allows, as required, the vibrational mobility of the seat part 11 with respect to the seat subframe 23 can to be largely canceled. For this purpose, one toothed rack 60 respectively is disposed at the rearward end of the cranks 54 which, as required, for example, in the event of an accident, can be caused to engage with corresponding locking devices 62 at the rearward receiving devices 47 of the supporting yokes 20, thereby achieving a fixing of the seat part 11 at the seat subframe 23.

FIG. 3 is a side view of the seat part 11 supported by the lateral supporting yokes 20 and the spring arrangement 21 on the seat subframe 23. The spiral springs 22 fastened to the cranks 38 and to the supporting yokes 20 are illustrated particularly in FIGS. 4a and 4b. An upper and a lower end 64, 65 of the serial spring 22 is received by an upper and a lower clamp-type socket 66, 67 and is fixedly connected with the latter, for example, by a glued connection. The spiral spring 22 has an approximately crescent-shaped construction and has an elastically flexible core 68, for example, made of an elastomer or polymer whose curved exterior and interior circumferential surface 69, 70 are fixedly connected with a curved exterior and interior spring band 71, 72 made particularly of spring steel. The width b of the core 68 is preferably slightly narrower than the two identically wide spring bands 71, 72 so that, under stress, the core 68 can bulge out laterally between the two spring bands 71, 72 slightly toward the outside. The lower clamp-type socket 67, together with the swivelling lever 73, is swivellably disposed by way of the screwed connection 39 on the respective assigned crank 38. The upper clamp-type socket 66 is fixedly connected on its top side 74 with the respective forward or rearward end 45, 46 of the supporting yoke 20, for example, by a welded connection.

Likewise, the upper end of the clamp-type socket 66 can be connected, instead by way of the respective supporting yoke 20, directly with the seat part 11. The supporting yoke 20 may be eliminated. The upper clamp-type socket 66 is fixedly connected with one end of a side plate 76 whose other end is swivellably disposed by a screwed connection 77 on the swivelling lever 73. In a non-compressed position of the seat part 11, the swivelling lever 73 points at an angle α of approximately 30° upward with respect to the horizontal line and, at its end facing away from the screwed connection 39, has a receiving device 78 with a thread on which the U-shaped frame 58 is fastened by a screwed connection 79 as seen in FIG. 2.

When the upper clamp-type socket 66 is acted upon by the weight of a passenger by way of the end 45, 46 of the supporting yoke 20 or by way of the seat part 20. This seat part 20, together with the side plate 76, is then moved downward against the spiral spring force. The swivelling lever 73 connected with the side plate 76 in an articulated manner and therefore also the receiving device 78 are also swivelled downward about the swivelling axis SH formed by means of the screwed connection 39. By means of the U-shaped frame 58 linked to the receiving devices 78. The swivelling movement of the four swivelling levers 73 and thus also the compression and rebounding of the spiral springs 22 can be caused to be uniform.

Figure 5:
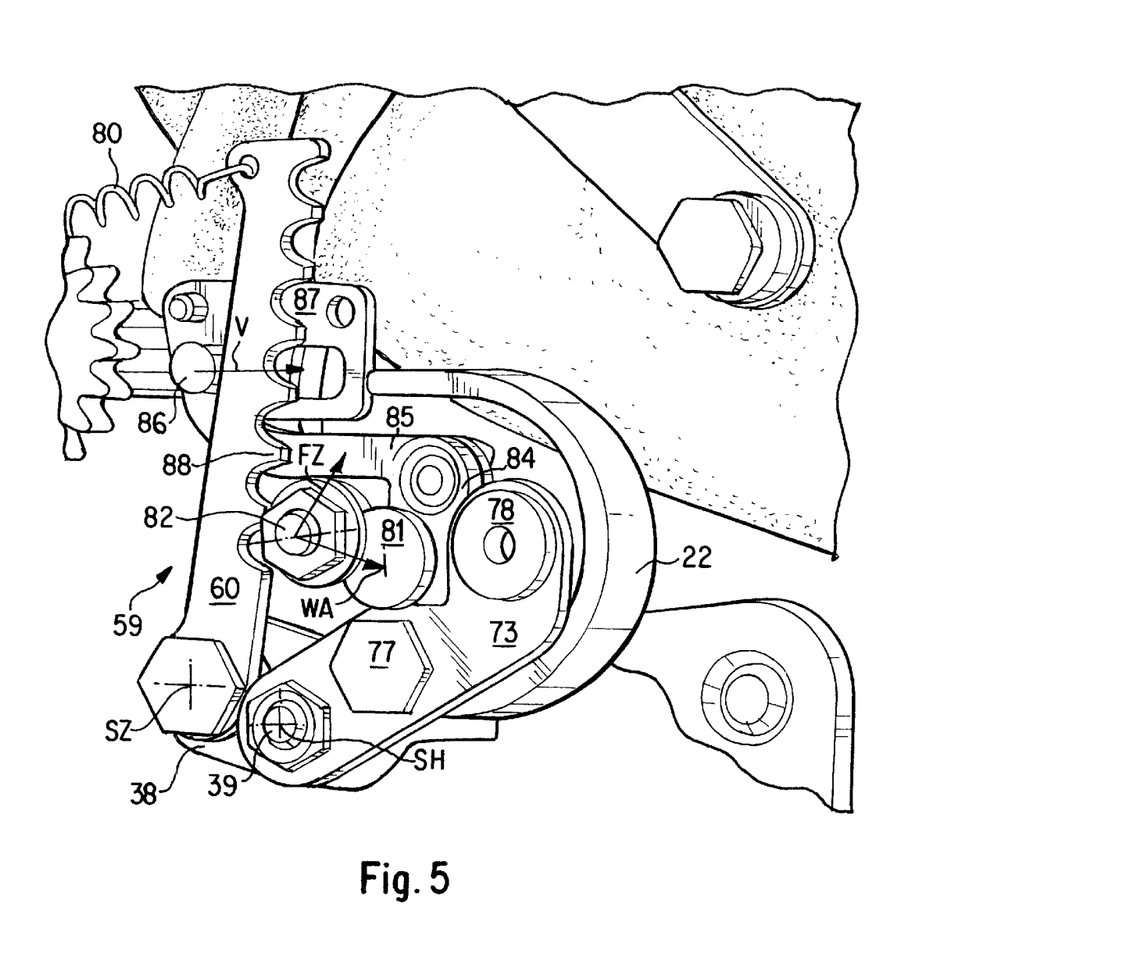
FIG. 5 is an enlarged perspective view of a locking mechanism of the vehicle seat according to the invention.
Figure 6:
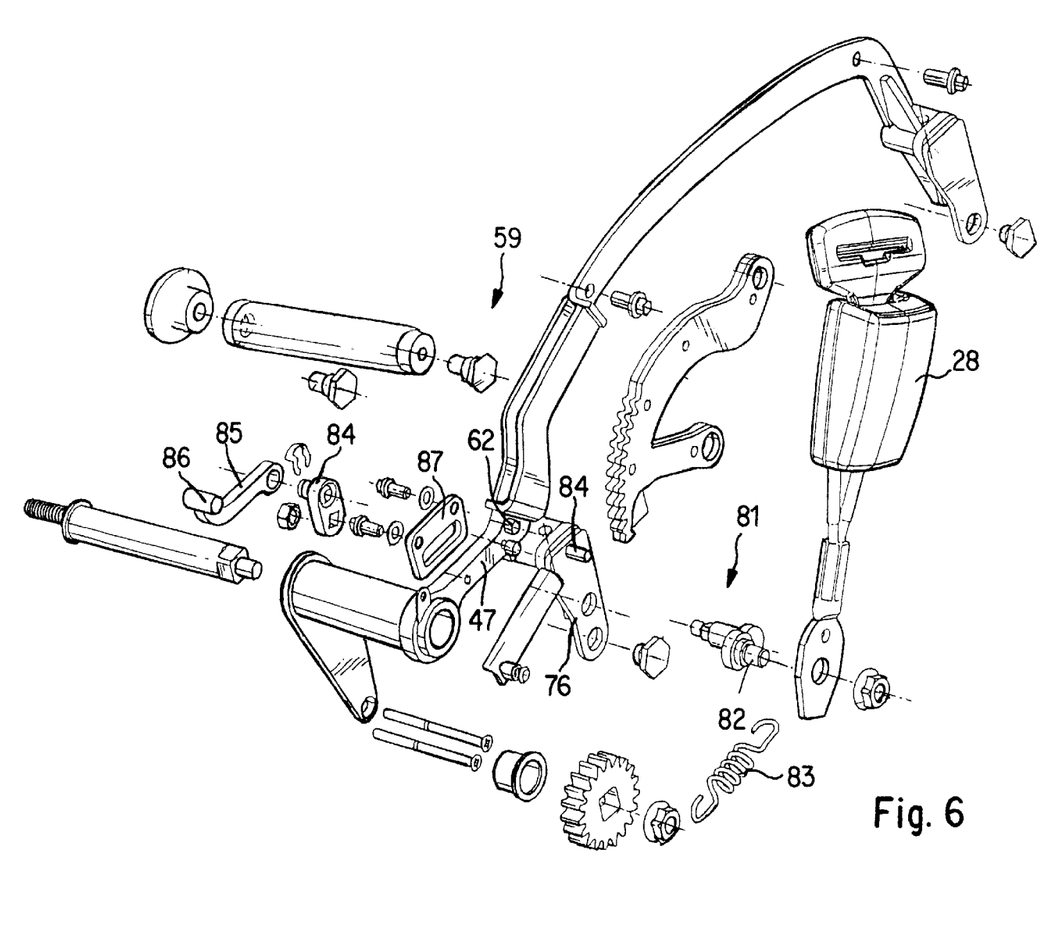
FIG. 6 is an exploded view of the locking mechanism and of a backrest adjusting device of the vehicle seat according to the invention.

FIGS. 5 and 6 are used particularly for explaining the locking mechanism 59. The toothed rack 60 is in each case swivellably about an axis SZ linked to the rearward leg end of the rearward cranks 38. The toothed rack 60 is held by a coil spring 80 in a rearward position disengaged from the locking devices 62. As illustrated particularly in FIG. 6, the buckle 28 is screwed to a receiving device 82 of a shaft lever 81 which is rotatably about an axis WA arranged in the side plate 76 of the spiral spring 22. The buckle 28 is held by another coil spring 83, as seen in FIG. 2, by spring force against a stop 84 on the side plate 76 in a rearward position. The end of the shaft lever 81 facing away from the buckle 28 is situated centrically with respect to the axis WA and is linked by way of a crank 84 fastened to the shaft lever 81 to a tension lever 85 whose bolt-type end 86 is guided within a connecting link 87. The connecting link 87 is fastened to the receiving device 47 at the rearward end 46 of the supporting yoke 20. The bolt-type end 86 of the tension lever 85 reaches behind the toothed rack 60 and, as the result of the force of the coil spring 79 applied to the toothed rack 60 as seen in FIG. 5 is situated in the most rearward position of the connecting link 87.

The belt tension force, which is applied to the buckle 28 in the event of an accident, acts as tension force FZ on the receiving device 82 of the shaft lever 81. Thereby, the created arm h rotates the shaft lever 81 about the shaft lever axis WA and the tension lever 85 therefore moves forward within the connecting link 87 in the direction of the arrow v as seen in FIG. 5. The toothed rack 60 is also moved forward against the force of the coil spring 80, until its teeth 88 engage with the locking devices 62 (FIGS. 2, 6) at the rearward end 46 of the supporting yoke 20 and the spiral spring 22 is therefore bridged by the toothed rack 60. On the side facing away from the buckle 28, the same arrangement of the locking mechanism 59 is provided. In the event of an accident, the belt tension force is transmitted there by a fitting for fastening one end of the seat belt to the shaft lever 81.

In the illustrated embodiment, only the two rearward spiral springs 22 are bridged by the toothed racks 60. Likewise, it is contemplated to configure all spiral springs 22 to be bridgeable, whereby the toothed racks 60 can be mechanically or pyrotechnically engaged with corresponding locking devices on the seat part 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle seat comprising a seat subframe, a seat part vibrationally supported movably by a spring arrangement having a plurality of springs on the seat subframe one end of the springs being fastenable to the seat part and another end of the springs being fastenable to the seat subframe, and a locking mechanism operatively arranged between the seat part and the seat subframe and so configured such that, in the event of an accident, the seat part is automatically fastened to the seat subframe while vibrational mobility is substantially canceled, wherein the seat part has lateral supporting yokes with a forward and rearward end supportable by a spiral spring on the seat subframe.

2. The vehicle seat according to claim 1, wherein the spiral springs have an approximately C-shaped configuration.

3. The vehicle seat according to claim 2, wherein the spiral springs have an approximately crescent-shaped configuration, and an elastically flexible core whose curved exterior and interior circumferential surfaces fixedly connected with an exterior and interior spring band.

4. The vehicle seat according to claim 2, wherein the one and another ends of the spiral springs are arranged to be received by respective clamp-type sockets respectively, an upper one of the clamp-type sockets being connected with the seat part and the a lower one of the clamp-type sockets being connected with the seat subframe.

5. The vehicle seat according to claim 4, wherein the core is of a plastic material having high damping characteristic.

6. The vehicle seat according to claim 1, wherein the compression movement of the spiral springs is caused to be uniform by way of an approximately U-shaped frame.

7. The vehicle seat according to claim 1, wherein the locking mechanism comprises at least two toothed racks each assigned to one of the rearward spiral springs, the at least two toothed racks being disposed on the seat subframe and, by means of an accident-caused belt tension force of the seat belt, are engaged with corresponding locking device at the seat part.

8. A vehicle seat comprising a seat subframe, a seat part vibrationally supported movably by a spring arrangement having a plurality of springs on the seat subframe one end of the springs being fastenable to the seat part and another end of the springs being fastenable to the seat subframe, and a locking mechanism operatively arranged between the seat part and the seat subframe and so configured such that, in the event of an accident, the seat part is automatically fastened to the seat subframe while vibrational mobility is substantially canceled, wherein the seat subframe is arranged to be longitudinally adjustably fastenable to the vehicle floor.

9. A vehicle seat comprising a seat subframe, a seat part vibrationally supported movably by a spring arrangement having a plurality of springs on the seat subframe one end of the springs being fastenable to the seat part and another end of the springs being fastenable to the seat subframe, and a locking mechanism operatively arranged between the seat part and the seat subframe and so configured such that, in the event of an accident, the seat part is automatically fastened to the seat subframe while vibrational mobility is substantially canceled, wherein the locking mechanism is configured to be operated by an accident-caused belt tension force of a seat belt.

10. Vehicle seat having a seat part swingably supported via a spring arrangement, comprising a plurality of springs on a seat underframe, the springs being fastenable by a respective one end thereof on the seat part and by a respective other end thereby on the seat underframe, and a locking mechanism begin provided between the seat part and the seat underframe to automatically fix the seat part to the seat underframe in the event of an accident while largely eliminating the swingability, and a belt buckle means fastened to the seat part for improving an effect of a seat belt system, wherein the locking mechanism is operable via an accident-caused belt pull of a seat belt of the seat belt buckle means which is applied to the seat part, and the vehicle seat with the seat part together with the backrest are swingably supported via the spring arrangement on the seat underframe.

* * * * *